United States Patent Office 3,567,753
Patented Mar. 2, 1971

3,567,753
POLYSILOXANE-POLYOXYALKYLENE
COPOLYMERS
Jean Claude Auguste Delaval and Paul Alfred Eugene
Guinet, Lyon, Jean Marius Ernest Morel, Bron, and
Robert Raphael Puthet, Lyon, France, assignors to
Rhone-Poulenc S.A., Paris, France
No Drawing. Filed Dec. 15, 1967, Ser. No. 690,726
Claims priority, application France, Dec. 23, 1966,
88,710
Int. Cl. C07f 7/08; C08f 11/04; C09g 53/08
U.S. Cl. 260—448.2
9 Claims

ABSTRACT OF THE DISCLOSURE

The invention relates to novel diorganopolysiloxane polyoxyalkylene copolymers of formula:

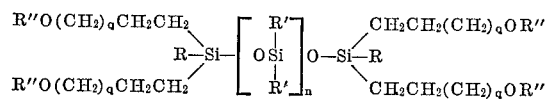
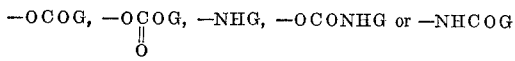

wherein R and R' are lower alkyl or cycloalkyl or aryl groups, $n$ is between 2 and 700, $q$ is 0 or an integer up to 3, the group R"O is A(—$CH_xH_{2x}O$—)$_y$, wherein $x$ is an integer from 2 to 4, $y$ is an integer of at least 1 and A is a formyloxy, $$-OCOG, -O\underset{\underset{O}{\|}}{C}OG, -NHG, -OCONHG \text{ or } -NHCOG$$

group wherein G is a hydrocarbon radical. The invention also relates to a process for preparing polyurethane foams employing these copolymers.

The present invention relates to new block copolymers derived from diorganopolysiloxanes and polyoxyalkylenes, to a process for preparing them, and to a process for preparing polyurethane foams employing them.

It is known that some linear copolymers of alkylene oxides and polysiloxanes in which the silicon atoms are attached to the polyoxyalkylene chains through silicon-carbon bonds can be used as surface-active agents in the preparation of polyurethane foams. These compounds are not hydrolysable and consequently they are stable to water and other substances containing reactable hydroxy groups. Such copolymers may be obtained by reacting linear organopolysiloxanes possessing silicon-hydrogen bonds with ethers of polyalkylene-glycols having a double bond at one end of the chain.

Ethers of polyalkylene-glycol having an alkoxy or aryloxy radical at the other end of the chain have been used, and the products obtained possess good surface-active properties, but they have the disadvantage of being water-insoluble or of giving very viscous aqueous solutions. Now, it is often industrially advantageous to employ solutions, either because it is desired to inject the products continuously with the aid of metering pumps, or because it is desired to agitate them during the addition of other products.

Copolymers have also been proposed in which the polyoxyalkylene units are terminated by carbonate or ester groups instead of a hydrocarbonyloxy radical, the other end always carrying an alkenyl grouping. These compounds have the valuable property of being soluble or dispersible in water. However polysiloxane-polyoxyalkylene block copolymers as hitherto prepared do not have a well-defined structure, since the polyoxyalkylene units are irregularly distributed along the polysiloxane chain. Having regard to the complex nature of polysiloxane-polyoxyalkylene copolymers, it is obviously desirable to have available starting materials which are as clearly defined as possible.

It has now been found that polysiloxane-polyoxyalkylene copolymers of well-defined structure which give, when water-soluble, aqueous solutions of low viscosity, are obtained if polysiloxanes having 4 silicon-hydrogen bonds are bonded to linear polymers consisting of a polyoxyalkylene chain whose terminal oxygen is attached to an alkenyl grouping, the other end being attached to a polar group such as ester, amide, amine or urethane group. The present invention therefore provides new diorganopolysiloxane-polyoxyalkylene copolymers of the general Formula I:

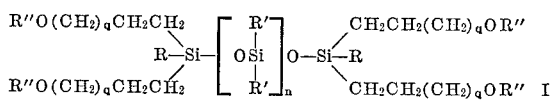 I where the groups R and R', which can be identical or different, are unsubstituted or halogen- or cyano-substituted lower alkyl radicals, or unsubstituted or mono- or di- halogen-substituted cycloalkyl radicals having from 3 to 6 ring carbon atoms; or phenyl, alkylphenyl or phenylalkyl radicals; $n$ is a number between 2–700; $q$ is 0 or an integer up to 3; the groups R"O—, identical or different radicals and are A(—$C_xH_{2x}O$—)$_y$ wherein $x$ is an integer from 2 to 4; $y$ is an integer of at least 1; A is a formyloxy, $$-OCOG, -O\underset{\underset{O}{\|}}{C}OG, -NHG, -OCONHG \text{ or } NHCOG$$

group wherein G is a hydrocarbon radical having up to 30 carbon atoms; the (—$C_xH_{2x}O$—) groups being the same or different when $y$ is greater than 1.

Examples of the radicals R and R' are saturated alkyl radicals having from 1 to 4 carbon atoms such as methyl, ethyl, propyl, isopropyl, butyl, chloromethyl, trifluoropropyl, β-cyanoethyl or γ-cyanopropyl; cycloaliphatic radicals such as cyclopropyl, cyclobutyl, cyclopentyl, cyclohexyl, dichlorocyclopropyl, fluorocyclobutyl or fluorocyclohexyl; phenyl radical; alkylphenyl radicals such as tolyl, xylyl or cumenyl, and phenylalkyl radicals such as benzyl or phenylethyl. The groups (—$C_xH_{2x}O$—) are generally

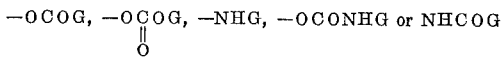

groups, and the radical G is preferably a hydrocarbon radical free from aliphatic unsaturation such as methyl, isopropyl, butyl, decyl, dodecyl, octadecyl, docosyl, octacosyl, phenyl, benzyl or diphenyl.

Whenever the symbols R, R' and OR" appear in the following, they are to be assumed to have the aforesaid meanings; likewise, $n$ and $q$ will represent the values previously indicated.

The present invention also provides a process for the preparation of the copolymers of Formula I comprising reacting a linear diorganopolysiloxane of the Formula II:

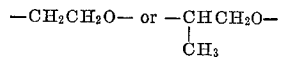 II with a linear polymer of the Formula III:

$$CH_2=CH-(CH_2)_qOR''$$ III in a mole ratio (III)/(II) of at least 4:1, in the presence of a catalyst for the addition of SiH bonds to the vinyl groups, and in an organic diluent which is inert to the reactants employed, so as to obtain, after elimination of the diluent, the copolymers of the invention of Formula I produced in accordance with the equation:

$$II + 4CH_2=CH(CH_2)_qOR'' \rightarrow (I)$$

Almost all the product recovered is the copolymer of Formula I but, when the reaction ceases, there may be recovered together with the copolymers (I), small quantities of other compounds having, for example, unreacted SiH bonds.

The diorganopolysiloxanes of Formula II may be prepared by the process described in French patent specification No. 1,404,561, by reacting two moles of a dihydrogenated silane possessing a hydrolysable group having an acid or basic reaction, with one mole of a diorganopolysiloxane, each end of which is terminated by a hydroxy radical; they may also be synthesised by telomerisation of cyclic compounds, for example $(R'_2SiO)_4$ with $H_2RSiCl$ in the presence of ferric chloride, followed by hydrolysis.

The polymers of Formula III can be obtained by conventional reactions by reacting the hydroxy group of an alkenyl monoether of a polyalkylene-glycol with an acid anhydride, an alkyl chloroformate or an alkyl isocyanate. The hydroxyl group of an organic compound $R''OH$ may also be converted to $OMe$ ($R''O$ having the meaning given in the foregoing, and Me being an alkali or alkaline-earth metal) and the latter may then be reacted with an alkenyl halide of formula $CH_2=CH_2(CH_2)_qX$, wherein X is a halogen. The compounds of formula $R''OH$ are themselves prepared by reaction of an acid, amide, or amine with one or more 1,2-epoxy compounds, for example, ethylene and isopropylene oxides (see N.G. Gaylord, "Polyethers. Part I. Polyalkylene Oxides and Other Polyethers").

The catalyst for the bonding of the SiH bonds to the vinyl groups is preferably platinum or one of its derivatives, such as platinum black, hexachloroplatinic acid, platinum di-, tri- and tetrachloride, platinum chloride-olefine complexes, or the products of reaction of hexachloroplatinic acid with organic compounds having functional groups, such as those described in French patent specification No. 1,367,044; it is also possible to use platinum deposited on carbon black, silica gel or γ-alumina. Normally, between 0.01 and 1.5 part of metal is employed per 100 parts by weight of vinyl groupings.

The copolymers of the present invention may be prepared as follows: the reactants, i.e. diorganopolysiloxane (II) and the polymer (III), are brought into contact in a diluent, in the presence of a chosen catalyst, until the addition of the SiH bonds to the vinyl groups is substantially complete or until it ceases, which is readily verified by taking specimens and titrating the SiH vinyl bonds. The mole ratio of polymer (III) to diorganopolysiloxane (II) should be at least 4:1, but preferably a molar excess of the compound (III) is used which may range up to 15%, in order that no unreacted SiH bonds may remain in the copolymers (I). The reactants, the catalyst and the diluent can be intimately mixed and heated to a temperature, for example, between ambient temperature and the boiling point of the mixture, for the time necessary for the completion of the reaction. A diluent is chosen which is inert to the reactants and to the catalyst. Examples of such diluents include petroleum ethers having a boiling point of more than 90° C., benzene, toluene, xylene, cumene, chlorobenzene and orthodichlorobenzene. A mixture of diluent and diorganopolysiloxane may also be added to a polymer (III)-diluent-catalyst mixture, or vice versa. The catalyst may also be completely or partly solubilised in the diluent, the quantity of the latter being at least 10 grammes to a quantity of catalyst containing 10 mg. of metal, and the reactants and a diluent may be slowly added to this catalytic solution, which is heated, for example, to the boiling point. In practice, the quantity of diluent present with these reactants will be between 40 and 250 parts to 100 parts of the reactants, these proportions being by weight.

Regardless of the manner in which the reactants are introduced into the reactor, it is often necessary, after all the reactants have been brought into contact, to heat the mixture for several hours in order to complete the reaction and it is even desirable to add fresh catalyst one or more times in order to restart the reaction. It is to be understood that the reaction between the SiH bonds and the vinyl groups may take place at temperatures below the boiling temperature of the mixture, which depends mainly upon the diluent employed. However, it is clear that the reaction period will be increased when operating at low temperatures.

When the reaction is complete, which can be checked by the almost complete disappearance of the SiH bonds and of the vinyl groups, the reaction product can, if desired, be treated either with activated charcoal or an activated earth, or with sodium bicarbonate in order to remove the traces of acid derived from certain of the catalysts such as the platinum chlorides. The solvent is then removed by distillation under reduced pressure. The residue is filtered, preferably through diatomaceous earth, and the copolymer of Formula I is finally obtained in the form of a homogenous clear oil having a viscosity for example between 20 and 10,000,000 centistokes at 25° C. depending upon the values of the indices $n$ and $y$.

These new copolymers (I) are stable to hydrolysis even in acidic or basic media and may be used in many applications in which the remarkable properties of diorganopolysiloxane-polyoxyalkylene block copolymers are utilised. Thus, when incorporated as additives into formulations for the preparation of polyurethane foams, they impart good stability to the foam before it completely hardens, thus making it possible to obtain flexible and rigid foams of excellent quality.

In this case, as is shown in practice, these copolymers, in order to be effective, must contain between 5% and 10% by weight of silicon calculated on the total weight of the copolymer, and the polyoxyalkylene chain must preferably comprise an alternation of units

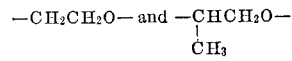

while the ratio of the number of units

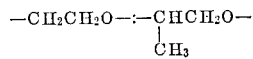

is between 30:70 and 55:45.

For other applications such as heat transfer fluids, mould release agents, lubricants for moving surfaces subjected to heavy loads and to high temperatures, emulsifying agents, components for cosmetics, batching agents for glass fibres and textile fibres, and wetting agents in general, the copolymers of the invention are particularly suitable without the number and nature of their units being subject to any limitations as narrow as those indicated in the foregoing with reference to additives for polyurethane foams.

The following examples, which are given by way of indication, illustrate the invention and show how it may be put into practice.

EXAMPLE 1

A dry boiling mixture of the acetate (62 g.; 0.0298 mol.) of the allyl monoether of a polyethylene-polyisopropylene-glycol of the mean formula:

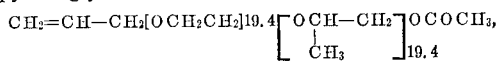

a catalytic solution (0.15 cc.) of platinum (0.75 mg.) prepared according to Example 1 of French patent specification No. 1,367,044 [hexahydrated hexachloroplatinic acid ($H_2PtCl_6 \cdot 6H_2O$) (1 part) and octyl alcohol (10 parts) was stirred for 15 to 30 minutes at ambient temperature in order to dissolve the acid. The product was heated by means of an oil bath to a temperature of 70° C. and this temperature was maintained for 6 hours, the toluene water, and hydrochloric acid being removed under reduced pressure until a vacuum of 20 mm. Hg was obtained, to give a blackish liquid containing 30 mg. of platinum per cc. The product obtained was then diluted with 6 times its volume of toluene], and toluene (70 cc.) in a 250 cc. round-bottomed flask provided with a thermometer, a mechanical stirrer, dropping funnel and reflux condenser was treated through the dropping funnel over 7 hours with a dry mixture of an α,ω-bis-(dihydromethylsilyl)-dimethylpolysiloxane (12.5 g.; 0.0068 mol.) of the mean formula:

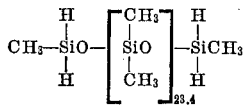

in toluene (55 cc.).

A further 0.15 cc. of the catalytic solution was added and the mixture refluxed for 8 hours. The solvent was then removed under reduced pressure and the residue filtered through diatomaceous earth to give a clear, slightly yellowish liquid (72 g.) having the following physical properties:

Viscosity at 25° C.—1178.5 cst.
Viscosity at 25° C. in 40% by weight aqueous solution—45 cst.
Percent hydrogen (by weight) as SiH bonds—0.004 (89% conversion of the SiH bonds).
Percent vinyl groups (by weight)—0.18 (91.6% conversion of the vinyl groups)

By way of comparison, if the acetate of the allyl monoether of polyalkylene-glycol was replaced by the same molar quantity of the allyl and butyl diether of polyethylene-polyisopropylene-glycol possessing the same number of units

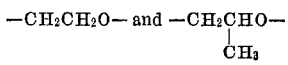

under the same operating conditions, then a copolymer having a viscosity at 25° C. in 40% aqueous solution of as much as 6500 cst. was obtained.

The oil prepared in accordance with this example, having a viscosity of 1178.5 cst. at 25° C., was employed in a proportion of 0.8% in the preparation of a polyurethane foam obtained from tolylene diisocyanate and polyalkylenetriol of a molecular weight of 3400 and containing both units

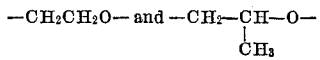

to give a cellular product of fine, regular structure of density 30 g./l.

EXAMPLE 2

A dry refluxing mixture of an α,ω-bis-(dihydromethylsilyl)-dimethylpolysiloxane (128.1 g.; 0.046 mol) of the mean formula:

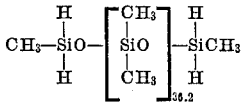

and toluene (400 cc.) in a 2-litre round-bottomed flask equipped as in Example 1 was treated through the dropping funnel over 3 hours with a dry mixture of the formate (400 g.; 0.209 mol) of the allyl monoether of a polyethylene-polyisopropylene-glycol of the mean formula:

a catalytic solution of hexachloroplatinic acid (0.37 cc.; 0.5 g./100 cc.; 1.85 mg. of platinum) in the above polyether, and toluene (460 cc.).

A further 0.55 cc. of the catalytic solution was added and the mixture refluxed for 1 hour. A further 1.85 cc. of the same catalytic solution was then added, and the mixture refluxed for 5 hours. The toluene was removed by distillation under reduced pressure and the residue filtered to give a clear yellowish oil (520 g.) having the following physical characteristics:

Viscosity at 25° C.—1616 cst.
Viscosity at 25° C. in 40% (by weight) aqueous solution—70 cst.
Percent hydrogen (by weight) as SiH bonds—0.0014 (96% conversion of the SiH bonds)
Percent vinyl groups (by weight)—0.18 (94% conversion of the vinyl groups)

By way of comparison, if the formate of the allyl monoether of polyalkylene-glycol was replaced by the same molar quantity of the allyl and butyl diether of a polyethylene-polyisopropylene-glycol possessing the same number of

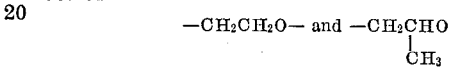

units, a copolymer having a viscosity at 25° C. in 40% aqueous solution of 7500 cst. was obtained.

We claim:
1. A diorganopolysiloxane polyoxyalkylene copolymer of general formula (I):

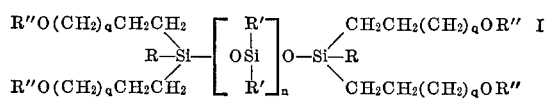

wherein R and R' are unsubstituted or halogen- or cyano-substituted lower alkyl groups, or unsubstituted or mono- or di-halogen-, substituted cycloalkyl groups having from 3 to 6 ring carbon atoms or phenyl, alkylphenyl or phenylalkyl groups; $n$ is a number between 2 and 700; $q$ is 0 or an integer up to 3; the groups R"O— are

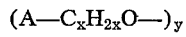

radicals, wherein $x$ is an integer from 2 to 4, $y$ is an integer of at least 1, A is a formyloxy,

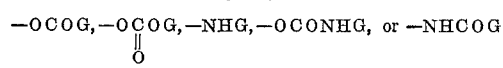

group wherein G is a hydrocarbon radical having up to 30 carbon atoms, the (—$C_xH_{2x}O$—) groups being the same or different when $y$ is greater than 1.

2. A copolymer according to claim 1, wherein R and R' are saturated alkyl groups having from 1 to 4 carbon atoms.

3. A copolymer according to claim 2, wherein R and R' are methyl, ethyl, propyl, isopropyl, butyl, chloromethyl, trifluoropropyl, β-cyanoethyl or γ-cyanopropyl groups.

4. A copolymer according to claim 1, wherein R and R' are cyclopropyl, cyclobutyl, cyclopentyl, cyclohexyl, dichlorocyclopropyl, fluorocyclobutyl or fluorocyclohexyl groups.

5. A copolymer according to claim 1, wherein R and R' are phenyl, tolyl, xylyl, cumenyl, benzyl or phenylethyl groups.

6. A copolymer according to claim 1, wherein the (—$C_xH_{2x}O$—) group is a —$(CH_2)_2O$— or

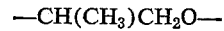

group.

7. A copolymer according to claim 1, wherein G is a hydrocarbon radical free from aliphatic unsaturation.

8. A copolymer according to claim 7, wherein G is a methyl, isopropyl, butyl, decyl, dodecyl, octadecyl, docosyl, octacosyl, phenyl, benzyl or biphenyl group.

9. A copolymer according to claim 1, which is a fluid having a viscosity between 20 and 10,000,000 centistokes at 25° C.

References Cited

UNITED STATES PATENTS

| | | | |
|---|---|---|---|
| 3,168,543 | 2/1965 | Black et al. | 260—448.2(B) |
| 3,172,899 | 3/1965 | Bailey | 260—448.2(B) |
| 3,280,160 | 10/1966 | Bailey | 260—448.2(B) |
| 3,398,104 | 8/1968 | Haluska | 260—448.2X |
| 3,402,192 | 9/1968 | Haluska | 260—448.2(B) |

TOBIAS E. LEVOW, Primary Examiner

P. F. SHAVER, Assistant Examiner

U.S. Cl. X.R.

260—2.5, 46.5, 825